(No Model.)

W. KELLER.
CIRCULAR SAWING MACHINE.

No. 318,260. Patented May 19, 1885.

WITNESSES:
Fred. G. Dieterich
John E. Kemon

INVENTOR:
Warren Keller
BY Munn & Co.
ATTORNEYS.

UNITED STATES PATENT OFFICE.

WARREN KELLER, OF ST. JOSEPH, MISSOURI, ASSIGNOR TO HIMSELF AND ALLAN LARD, OF SAME PLACE.

CIRCULAR SAWING MACHINE.

SPECIFICATION forming part of Letters Patent No. 318,260, dated May 19, 1885.

Application filed March 23, 1885. (No model.)

*To all whom it may concern:*

Be it known that I, WARREN KELLER, a citizen of the United States, residing at St. Joseph, in the county of Buchanan and State of Missouri, have invented certain new and useful Improvements in Sawing-Machines, of which the following is a description.

Figure 1:
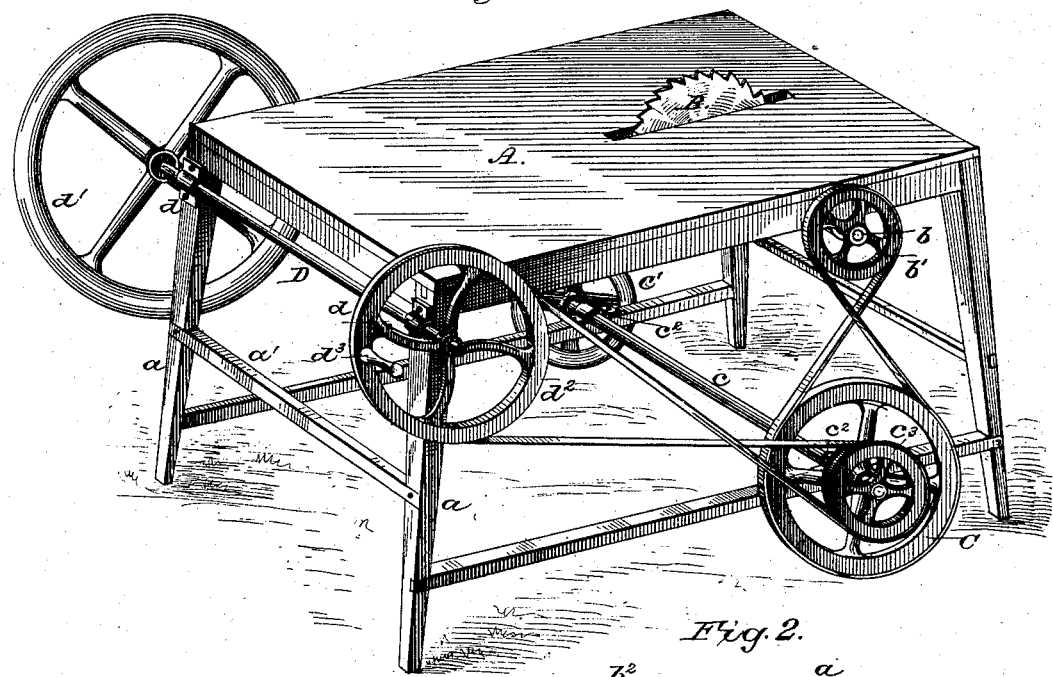
Figure 2:
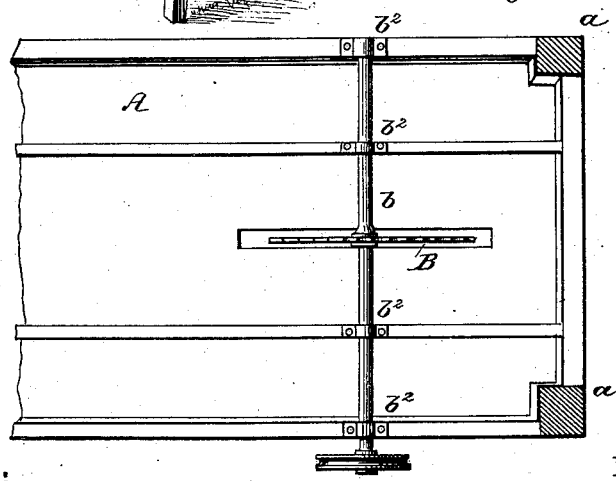

Figure 1 is a perspective view of my improved sawing-machine. Fig. 2 is an inverted plan view of the saw-shaft and a portion of the table, showing how the said saw-shaft is journaled.

My invention relates to circular saws used in general for sawing lumber; and it consists in the detailed construction and combination of the parts, hereinafter fully described, by which a circular saw can be easily manipulated by hand, and is thereby adapted to the needs of carpenters, farmers, and all those who have occasion to use a circular saw, but who have not sufficient work to warrant the employment of horse-power or steam.

In the accompanying drawings similar letters of reference indicate corresponding parts in both figures.

A is a table provided with legs $a$ and braces $a'$, so that it may stand very steady.

B is a circular saw mounted about the middle of the saw-shaft $b$, and provided with the driving-pulley $b'$, secured at one end of the shaft. I prefer to mount the saw B about the middle of the shaft, instead of at one end of the same, which is the manner in which circular saws are usually arranged to work, and in order to further increase the steadiness of its action I provide four bearings, $b^2$, which are rigidly attached to cross-pieces on the under side of the top of the table, instead of only two bearings, as commonly employed. The saw-shaft pulley $b'$ receives its motion by means of a belt from a large pulley, C, which is mounted upon the intermediate shaft, $c$.

$c'$ is a fly-wheel secured on one end of shaft $c$.

$c^2$ are bearings in which the said shaft runs.

$c^3$ is a small pulley, also secured on shaft $c$.

D is the driving-shaft, journaled in the bearings $d$, which are firmly secured to the framework of the table at a convenient height above the ground.

$d'$ is a fly-wheel mounted on one end of shaft D. $d^2$ is a driving-pulley, also mounted on the said shaft, and provided with the handle $d^3$, so that hand-power can be applied for working the machine. The belt-pulley $d^2$ is connected to the small pulley $c^3$, so that the rotary motion of shaft D is communicated to shaft $c$ with increased velocity, and from thence to the saw-shaft $b$, as before explained. The fly-wheels $c'$ and $d'$ are for storing up the power, and for equalizing the motion of the shafts to which they are attached.

I do not confine myself to the precise form of table herein described, and shown in the drawings, as such table may be made and framed together in various ways, so as to form a rigid base for the attachment of the saw and its driving-pulleys.

I sometimes carry out the end of the shaft on which the circular saw is fastened beyond the edge of the table opposite to that end at which the driving-pulley is secured, and fasten upon the extension of the said saw-shaft an additional fly-wheel (not shown in the drawings) for the purpose of assisting the saw in its work.

Having thus described my invention, what I claim as new, and desire to secure by Letters Patent, is—

1. In a sawing-machine, the combination, with a table, of a circular saw mounted on a shaft provided with bearings on either side of the said saw, and a pulley for driving it, an intermediate shaft running in bearings and provided with a fly-wheel, a small driving-pulley and a large pulley connected to the driving-pulley on the saw-shaft, and a driving-shaft running in bearings, and provided with a fly-wheel and a driving-pulley provided with a handle for imparting motion to the said intermediate shaft, substantially as described and shown, and for the purpose set forth.

2. In a sawing-machine, the combination of table A, circular saw B, shaft $b$, provided with bearings $b^2$ on either side of the said saw, and pulley $b'$, intermediate shaft, $c$, provided with bearings $c^2$, fly-wheel $c'$, pulleys C and $c^3$, and the driving-shaft D, provided with bearings $d$, fly-wheel $d'$, driving-pulley $d^2$, and handle $d^3$, substantially as described and shown, and for the purpose set forth.

WARREN KELLER.

Witnesses:
SILAS WOODSEN,
ENOCH KELLER.